United States Patent
Richardson et al.

(10) Patent No.: US 12,131,170 B2
(45) Date of Patent: Oct. 29, 2024

(54) OUT-OF-PROCESS EFFECTS FOR ELECTRONIC DEVICES

(71) Applicant: Apple Inc., Cupertino, CA (US)

(72) Inventors: Andrew P. Richardson, San Francisco, CA (US); Abhinay Ashutosh, Sunnyvale, CA (US); James T. Turner, San Jose, CA (US); Przemyslaw M. Iwanowski, San Francisco, CA (US); Yidi Zhu, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/213,787

(22) Filed: Jun. 23, 2023

(65) Prior Publication Data

US 2024/0004678 A1    Jan. 4, 2024

Related U.S. Application Data

(60) Provisional application No. 63/470,952, filed on Jun. 4, 2023, provisional application No. 63/449,945, filed on Mar. 3, 2023, provisional application No. 63/402,435, filed on Aug. 30, 2022, provisional application No. 63/358,070, filed on Jul. 1, 2022.

(51) Int. Cl.
    *G06F 3/01*      (2006.01)
    *G06F 3/0482*      (2013.01)
    *G06F 9/451*      (2018.01)

(52) U.S. Cl.
    CPC .............. *G06F 9/452* (2018.02); *G06F 3/013* (2013.01); *G06F 3/017* (2013.01); *G06F 3/0482* (2013.01)

(58) Field of Classification Search
    CPC .. G06F 3/0481; G06F 3/04847; G06F 3/0482; G06F 3/04842; G06F 3/013; G06F 3/017; G06F 9/452
See application file for complete search history.

(56) References Cited

U.S. PATENT DOCUMENTS

| | | |
|---|---|---|
| 5,825,352 A | 10/1998 | Bisset et al. |
| 9,792,018 B2 | 10/2017 | Van Os et al. |
| 11,334,147 B1 | 5/2022 | Upchurch |
| 11,580,701 B2 | 2/2023 | Chaurasia |

(Continued)

OTHER PUBLICATIONS

Fernando Zaldivar Coto et al., Scheduling of events through notifications in mobile devices, Aug. 1, 2019, IV Jornadas Costarricenses de Investigación en Computación e Informática, pp. 1-6 (Year: 2019).*

(Continued)

*Primary Examiner* — Tam T Tran
(74) *Attorney, Agent, or Firm* — BAKERHOSTETLER

(57) ABSTRACT

Remote user interface (UI) rendering effects provide increased privacy and efficiency in computer user input systems. In an aspect, an application specifies remote UI effects to be managed and rendered on UI elements separately from the application, such as by an effects component running outside of the application's operating system process. When user input indicates a preliminary interaction with a UI element, the remote UI effect can be rendered without the application's knowledge of the preliminary interaction, hence preserving a user's privacy from the application of preliminary UI interactions.

49 Claims, 6 Drawing Sheets

(56) References Cited

U.S. PATENT DOCUMENTS

| | | |
|---|---|---|
| 11,592,899 B1 | 2/2023 | Haine |
| 11,698,720 B2 | 7/2023 | Kang |
| 11,816,262 B1 | 11/2023 | Kinkade |
| 2019/0188895 A1 | 6/2019 | Miller, IV et al. |
| 2021/0113922 A1 | 4/2021 | Summa et al. |
| 2021/0201021 A1* | 7/2021 | Novelli .................. G06F 3/013 |
| 2021/0325960 A1 | 10/2021 | Iglesias |
| 2022/0253182 A1* | 8/2022 | Schwarz ................. G06F 3/167 |
| 2024/0143077 A1* | 5/2024 | Prasad ..................... G06T 7/70 |

OTHER PUBLICATIONS

Na Li et al., Survey of Cloud Messaging Push Notification Service, Dec. 1, 2013, International Conference on Information Science and Cloud Computing Companion, pp. 273-279 (Year: 2013).*
International Search Report and Written Opinion from PCT/US2023/026509, dated Oct. 17, 2023, 14 pages.

\* cited by examiner

OUT-OF-PROCESS EFFECTS FOR ELECTRONIC DEVICES

CROSS REFERENCE TO RELATED APPLICATIONS

This application claims the benefit of priority to: U.S. Provisional Patent Application No. 63/358,070, entitled, "OUT-OF-PROCESS EFFECTS FOR ELECTRONIC DEVICES", filed on Jul. 1, 2022; U.S. Provisional Patent Application No. 63/402,435, entitled, "OUT-OF-PROCESS EFFECTS FOR ELECTRONIC DEVICES", filed on Aug. 30, 2022; U.S. Provisional Patent Application No. 63/449,945, entitled, "OUT-OF-PROCESS AUDIO EFFECTS FOR ELECTRONIC DEVICES", filed on Mar. 3, 2023; and U.S. Provisional Patent Application No. 63/470,952, entitled, "OUT-OF-PROCESS EFFECTS FOR ELECTRONIC DEVICES", filed on Jun. 4, 2023 the disclosure of each which is hereby incorporated herein in its entirety.

TECHNICAL FIELD

This disclosure relates to human-computer interface technologies and computer privacy including, for example, to out-of-process effects for electronic devices.

BACKGROUND

Operating system software generally provides an abstraction layer between user interface hardware and applications that run on top of the operating system. Multiple applications may run in separate operating system processes with corresponding user interface windows presented on a computer display managed by the operating system.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
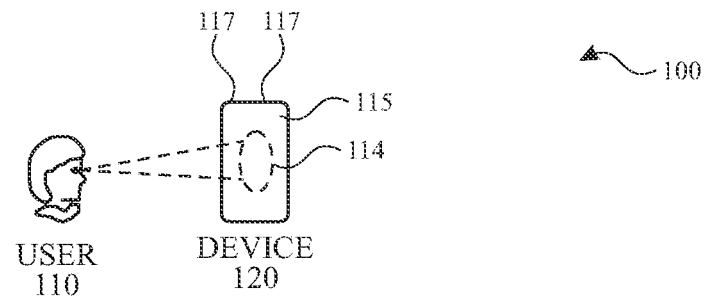
FIG. 1 illustrates an example environment for practicing aspects of this disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of this disclosure include techniques for providing increased privacy and/or efficiency in computer user input systems. While any computer input system may benefit from these techniques, systems that are capable of capturing personally identifiable user data, such as extended reality systems that track a user's hand gestures and/or eye gaze location, may particularly benefit from these techniques.

In an aspect of this disclosure, a user input and rendering system may receive and render user input, and may filter the user input available to computer software application (or "app" herein). User input filtering enables a user's privacy from the application at least by restricting the application's access to the user's filtered input data. In some aspects, a computer user input and rendering system may be more trusted than an application running on the same computer because, for example the user input and rendering system is provided by a trusted operating system vendor, while the application is provided by a less trusted third-party application vendor.

In an aspect, a user may receive rendered feedback of the user's preliminary interactions with a user interface element, such a button or scroll bar, without making the preliminary interactions available to the application itself. Preliminary interactions with a UI element may include a user's intentional initial interactions with a user interface, such as exploration of the application's interface (for example to discover that a rectangle with a square inside is actually a scroll bar), and preliminary interactions may also include unintentional and even unconscious interactions with UI elements of the application (e.g., as the user's eyes move across a user interface without the user attending to the user interface).

Aspects of this disclosure provide techniques for efficiently retaining privacy of a user's preliminary UI interactions from an application while still providing rendered feedback of the preliminary interactions to the user. Rendered feedback of a preliminary interaction with a UI element might include, for example, a rendered visual cue (e.g., a glow, a lift, a shape change, a transparency change, etc.) and/or audio cue when a hand gesture occurs near a UI element, when a user's hand hovers over or near a UI element, when a user's gaze location is near or hovers near or over the UI element, or when a pointer controlled by a trackpad or pointer device (e.g., a mouse, a joystick, or the like) hovers at or near the UI element. In an aspect, when it is determined that a user intends to interact with an application (or a UI element of the application), then the user input may be considered no longer to be preliminary (e.g., may be considered to be confirmed), and some user input may be provided to the application. In an aspect, an application may make a declaration or definition of a rendered feedback effect of preliminary interactions with a UI element before preliminary interactions occur, giving the application control over the nature of the preliminary interaction feedback effect, even when the application never learns of a preliminary interaction with its UI elements. The application may provide a declaration or definition of the effect to an operating system or another software component for managing rendering of the preliminary interactions. When the rendering of the effect is managed in a separate operating system process from the application proving the declaration or definition of the effect, the effect is referred to herein as a remote effect or an "out-of-process effect".

As noted above, aspects of this disclosure may be applied to extended reality systems. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, user input may include tracking of a person's physical motions, and, in response the XR system may render an adjustment to one or more characteristics of one or more virtual objects simulated in the XR in a manner that comports with at least one law of physics. For example, if a user's hand gesture is rendered in an XR system at a location near but not touching a rendered application UI element, the UI element may be rendered with a glow or jiggle or otherwise indicate a preliminary interaction with that UI element (e.g., to indicate that the UI element is interactive and/or to guide the user toward targeting that UI element) without notifying the application of the preliminary user interaction. In an alternate example, if a user's hand gesture touches or grasps the UI element (e.g., and/or of the user's hand gesture at a location near or away from the UI element occurs while the user's gaze intersects with the UI element), it may be determined that the user deliberately intended to interact with the UI element, and then the user input indicating a touch or grasp of the UI element may be provided to the application.

Many different types of electronic user input and rendering systems may enable a human user to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Aspects of this disclosure provide rendered confirmation to a user of user engagement with an application user interface prior to providing user input to the application. A user interface (UI) may be displayed to appear at a location in a physical environment that is remote from a user input device and/or remote from the display device that displays the user interface (e.g., in a three-dimensional XR display environment). For example, physical movement of a mouse input device may be rendered as movement of a mouse cursor on a display at a different physical location (perhaps just a few inches) from the physical mouse. As another example, a gaze cursor may indicate the location of a user's gaze, the location of the user's gaze being remote from one or more eye-facing cameras that are used to determine the gaze location. Similarly, a hand gesture may be rendered as a hand object in a virtual space and presented to a user. Thus, a rendered effect of user input may be rendered or presented to a user at a location that is physically separated from the physical location of the sensor that obtained sensed user input. In a virtual space or other extended reality environment, the user input may also occur at a location that is remote from the display component that displays an application UI and/or a representation of the user's hand to appear to the user to be at a location remote from the display component.

Moreover, a user may move their hand and/or direct their gaze at or near a rendered application user interface without intending to interact with the application UI (e.g., due to normal motion of the user around the physical environment, such as during a conversation with another person unassociated with the electronic device), and/or may perform hand gestures for interaction with one displayed application UI that are not intended to be provided to an application associated with another displayed application UI.

Aspects of the disclosure include receiving, at a system process of an electronic device from an application running on the electronic device, a definition of an effect for a first user interface (UI) element managed by the application. While the first user interface element is displayed by the electronic device without the effect applied to the first user interface element, the system process may receive a user input. In response to a determination that the user input corresponds to the first user interface element displayed without the effect, rendering, by the system process and without providing the user input to the application, the effect on the first UI element according to the definition. In one or more implementations, the system process may also provide lighting, mirroring, and/or anchoring on behalf of the application, such as without providing information about the lighting, mirroring, and/or anchoring to the application.

FIG. 1 illustrates an example environment 100 for practicing aspects of this disclosure. In example environment 100, a user 110 interacts with a computing device 120 having a display 115. As shown, the computing device 120 may include one or more speakers, such as speakers 117 (e.g., multiple speakers operable to generate spatialized audio that is perceived, by the user 110 to be emanating from a location, separate from the location of the speakers 117, in the physical environment of the user 110. In one or more examples described herein, user 110 may gaze at computing device 120, and the device may sense a gaze location 114 of the user. In one or more implementations, the user's gaze location my constitute a user input to the device.

The computing device 120 may be a smart phone, a tablet device, or a wearable device such as a smart watch or a head mountable portable system, that includes a display system capable of presenting a visualization of an extended reality environment to the user 110. The computing device 120 may be powered with a battery and/or any other power supply. In an example, the display system of the computing device 120 provides a stereoscopic presentation of the extended reality environment, enabling a three-dimensional visual display of a rendering of a particular scene, to the user. In one or more implementations, instead of, or in addition to, utilizing the computing device 120 to access an extended reality environment.

The computing device 120 may include one or more cameras (e.g., visible light cameras, infrared cameras, etc.) Further, the computing device 120 may include various sensors that can detect user input including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the computing device 120 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The computing device 120 may also detect and/or classify physical objects in the physical environment of the computing device 120.

In one or more implementations, the computing device 120 may be communicatively coupled to a base device. Such a base device may, in general, include more computing resources and/or available power in comparison with the computing device 120. In an example, the computing device 120 may operate in various modes. For instance, the computing device 120 can operate in a standalone mode independent of any base device.

The computing device 120 may also operate in a wireless tethered mode (e.g., connected via a wireless connection with a base device), working in conjunction with a given base device. The computing device 120 may also work in a connected mode where the computing device 120 is physically connected to a base device (e.g., via a cable or some other physical connector) and may utilize power resources provided by the base device (e.g., where the base device is charging the computing device 120 while physically connected).

When the computing device 120 operates in the wireless tethered mode or the connected mode, a least a portion of processing user inputs and/or rendering the extended reality environment may be offloaded to the base device thereby reducing processing burdens on the computing device 120. For instance, in an implementation, the computing device 120 works in conjunction with a base device to generate an extended reality environment including physical and/or virtual objects that enables different forms of interaction (e.g., visual, auditory, and/or physical or tactile interaction) between the user and the extended reality environment in a real-time manner. In an example, the computing device 120 provides a rendering of a scene corresponding to the extended reality environment that can be perceived by the user and interacted with in a real-time manner. Additionally, as part of presenting the rendered scene, the computing device 120 may provide sound, and/or haptic or tactile feedback to the user. The content of a given rendered scene may be dependent on available processing capability, network availability and capacity, available battery power, and current system workload.

The computing device 120 may also detect events that have occurred within the scene of the extended reality environment. Examples of such events include detecting a presence of a living being such as a person or a pet, a particular person, entity, or object in the scene.

Figure 2:
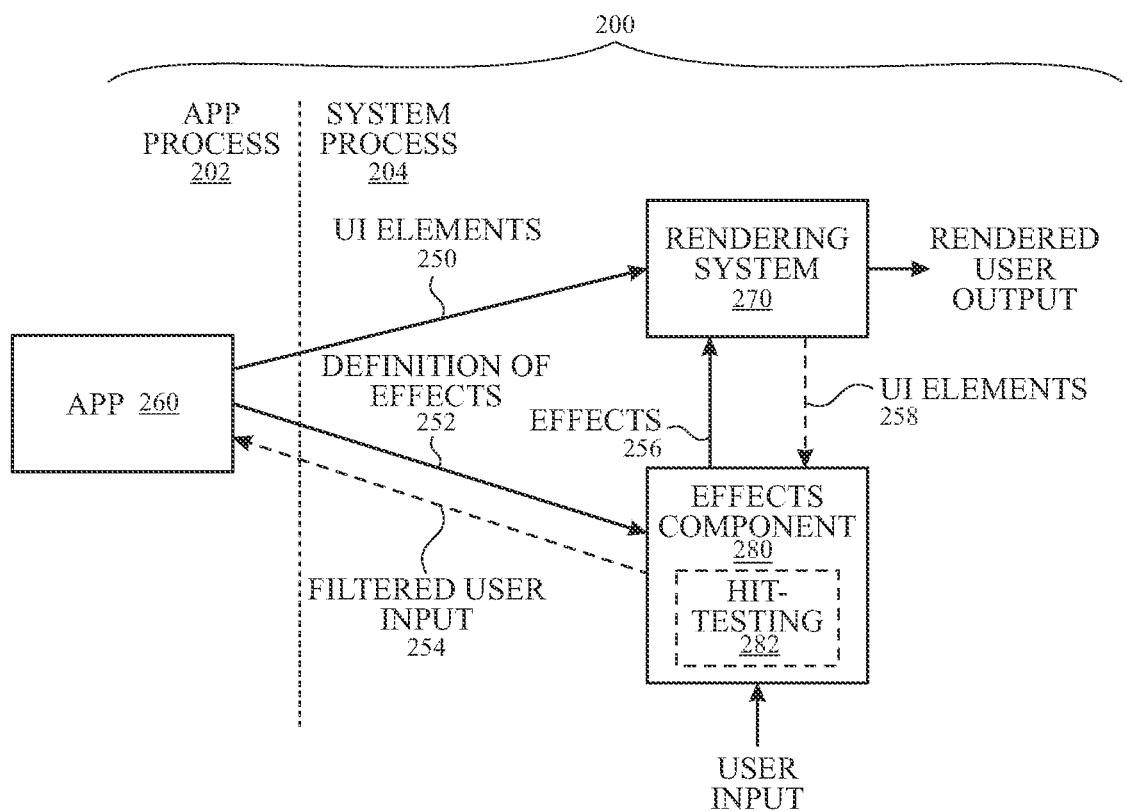
FIG. 2 illustrates an example system providing out-of-process effects, in accordance with aspects of the subject disclosure.

FIG. 2 illustrates an example system 200 for providing out-of-process effects. System 200 may be implemented, for example, on computing device 120. System 200 includes an application (app) process 202 corresponding to an application 260, and a system process 204, including a rendering system 270 (e.g., a rendering process) and an effects component 280 (e.g., an effects process). In some aspects, processes 202 and 204 may be separate processes created and managed by an operating system and run on a common device, such as computing device 120. Aspects of the system process 204 (e.g., including the rendering system 270, the effects component 280, and/or hit-testing 282) may be implemented in hardware, software, or a combination thereof.

As depicted in FIG. 2, system process 204 includes both rendering system 270 and effects component 280. However, this disclosure is not so limited. For example, rendering system 270 may run in a separate process from the effects component 280, the rendering system 270 and the effects component 280 may be implemented in a common process, or the rendering system 270 and effects component 280 may be further distributed to run in more than two processes, all of which may be separate from app process 202. Similarly, in other aspects, app 260 may be distributed to run in more than one app process. Operating system processes, such as app process 202 and system process 204, may provide security and/or privacy between the processes when running on a common device, such as computing device 120 of FIG. 1 or the computing device of FIG. 8. For example, app process 202 and system process 204 may operate with different virtual memory spaces as controlled by an operating system and enforced by a processor's memory controller hardware. Separate app and system processes may help prevent app 260 from accessing data inside system process 204. In other aspects, system process 204, rendering system 270 and effects component 280 may include one or more operating system drivers that do not run in a virtual memory space.

Operation of system 200 may include receiving a user input, and outputting a rendered effect as feedback of the user input, and this may be performed outside of the app process 202 and without knowledge of app 260. App 260 may provide a description of its UI element(s) 250 to rendering system 270, and app 260 may provide a definition of its effects 252 to be rendered in response to future user input. When effects component 280 receives user input corresponding to a definition of effects received from app 260, effects component 280 may cause effects 256 to be rendered by rendering system 270 as user output.

In optional aspects of system 200, effects component 280 may learn of a location of a UI element (e.g., a location of a button or scroll bar), for example via optional UI elements 258 message from rendering system 270. In one or more implementations, effects component 280 may then perform optional hit-testing 282 between a current location of a UI element and a current location of user input. In one or more other implementations, hit-testing 282 may be performed by another system process that is separate from the effects component 280 and that performs hit-testing for multiple different purposes (e.g., for the effects component 280 and other components and/or processes). When a particular user input is identified as being associated with a particular UI element by hit-testing 282 (e.g., by the effects component 280 or another system process of the computing device 120) between a user input and a particular UI element of an app 260, hit-testing 282 may identify a preliminary interaction with the particular UI element of the app 260. In one or more implementations, hit-testing 282 may include a "fuzzy" hit-testing operation that intentionally biases the hit-test result toward interactive UI elements (e.g., and away from non-interactive UI elements). As examples, when a user's gaze is approximately halfway between an interactive UI element (e.g., a button, a slider, a list, a text-entry field, etc.) and a non-interactive UI element (e.g., static text and/or unlinked images) and/or when the user's gaze intersects with an interactive UI element and a non-interactive element at different depths, hit-testing 282 may determine that the gaze is associated with the interactive UI element. When a preliminary interaction is identified, effects 256 may be rendered as user output without notifying app 260 of the user input or the identified interaction. Alternately, when an alternate user input is identified as a confirmed interaction by a user with a UI element, then effects component 280 or another system process may notify app 260 of the confirmed interaction as filtered user input message 254.

The definition of effects 252 may describe a variety of effects that an app instructs the system process 204 to render on one or more UI elements. Each effect defined in the definition of effects 252 may correspond to a certain type of user input interaction with a particular UI element. In aspects, the definition of effects 252 may describe a plurality of effects to be rendered in response to a single user input interaction with a single UI element. For example, definition of effects 252 may indicate that when a user's gaze is within a certain range of a particular button UI element, the button will start to glow to a certain brightness level and/or emit a sound, and when a gaze is in a closer distance range to the button, the UI element may both glow at a brighter level and also wiggle and/or generate a buzzing sound, and when a gaze is in a third closest range (perhaps gazing directly at the button and/or gazing directly at the button for at least a predefined dwell time, such as one second, one half second, one tenth of a second, or a smaller fraction of a second), the user interaction may be identified as a confirmed interaction (e.g., an interaction intended by the user as an actuation of the button).

In an alternate optional aspects, app 260 may provide effects component 280 with information describing the UI element of the app 260 directly (e.g., instead of the effects component 280 receiving UI information from the rendering system 270). Additionally, instead of hit-testing based on location, hit-testing 282 may more generally determine that a certain user input corresponds to an interaction with a particular user interface element. For example, a user's verbal audio input saying "the red button" may cause the hit-testing 282 to associate that audio input with a red button UI element.

In an aspect, definition of an effect 252 may be a declarative definition. In this aspect, app 260 may provide all information necessary for a software component outside of app process 202, such as effects component 280, to cause the app's desired effect to be rendered without the app's knowledge or further participation. A declarative definition of an effect may include an identification of a UI element, for example provided by a user interface framework or the operating system, an identification of a triggering user input, and an identification of an effect to be rendered when the triggering user input corresponds to the first UI element. In one or more implementations, the identified effect may include a selected one of multiple pre-defined effects (e.g., a highlight effect, a glow effect, or a lift effect) available from the system process, may include an indication for the system process to automatically select a pre-defined effect, or may include instructions for rendering a custom effect provided by the app 260.

In one or more implementations, the identified effect may be applied to an entire UI element or a to sub-view or sub-element of a UI element (e.g., an internal background sub-view of a text field, a sub-element of a slider such as a thumb of the slider, a sub-element of a segmented control element, a cell of a collection view, a cell of a table view, or a sub-element of a date picker or other picker). In one or more implementations, the same effect can be applied to multiple sub-elements of a UI element. In one or more implementations, different predefined or custom effects can be applied to different sub-elements of a UI element. In an example of a collection or a table of cells, an effect may be defined based on heuristics, such as whether a given cell is highlightable or selectable. For example, these heuristics may model the intent of showing a hover effect if a cell is interactive (e.g., where a nil effect may be used if a cell is non-interactive). In one or more implementations, if an app has explicitly set an effect style for a cell, heuristics may be disabled and the explicit style may be used. For example, a hover effect may be disabled for an application's list row, view hierarchy, etc. In one or more implementations, a definition of an effect may include multiple definitions of multiple effects (e.g., the same or different effects) for multiple respective sub-elements of a UI element (e.g., the same or different effects may be applied when a hover interaction is detected at or near a selectable date or time in a picker).

In one or more implementations, providing the definition of an effect 252 may include providing a definition of a shape of an effect and/or a shape of an underlying UI element. For example, the shape of an effect may include a capsule shape, a rectilinear shape, a circular shape, or other predefined or custom shape. In one or more implementations, the definition of the shape may include definitions of one or more of a corner shape, a corner radius, a corner curve, corner masking, and/or other corner and/or edge definitions for a shape. In one or more implementations, the shape may not have an intrinsic frame or size, and may instead be resolved to a concrete shape within a given frame (e.g., which may more provide a more expressive shape that can automatically adapt to the view with which the shape is associated). For example, a pre-defined capsule shape may be provided that can include corners that are automatically resizable based on a provided frame for the shape.

In one or more implementations, the definition of the shape may include a definition of an inset shape (e.g., for an effect that is inset to, or occurs within the boundaries of, a UI element) and/or an outset shape (e.g., a shape that is outset to, or occurs outside the boundaries of, a UI element, such as by padding via negative insets). In one or more implementations, the definition of the shape can automatically inset a rounded-rectilinear shape that preserves concentric corner radii proportional to its size. In one or more implementations, the definition of the shape may include a definition of a dynamic shape (e.g., that can be resolved within a given context). For example, a dynamic shape definition may be used to create a shape that uses fractional corner radii. A dynamic shape may have dynamic edges and/or corners, and/or may include dynamic transparency, brightness, or other dynamic features of the overall shape. In one or more implementations, a shape for an effect may be expressed as a modification of a view's (e.g., a UI element's) content shape or its container's shape. For example, the app 260 may modify an effect shape for a button UI element to provide padding while preserving its original shape heuristics. In one or more implementations, the shape may be defined to correspond to the container in which the shape is to be rendered. In one or more implementations, a shape may be defined as a nil shape that causes use of an implicit default shape.

In one or more implementations, a definition of an effect 252 may be provided without a shape definition. In one or more implementations, when a shape definition is not provided, a default shape may be determined by the system process. In one or more implementations, when a shape definition is not provided for a pointer-style input, a predefined preview shape for the pointer may be used for the shape of an effect. In one or more implementations, hover effects may be deactivated during a drag touch input by a user. In one or more implementations, drag touch inputs (e.g., for some UI elements) may be disabled when a hover effect is applied (e.g., to other UI elements). In one or more implementations, the UI element may be vended from one or more files, such as a Universal Scene Description (USDZ) file. In another implementation, the UI element referenced in the app's declarative definition may be provided by the operating system.

Figure 3:
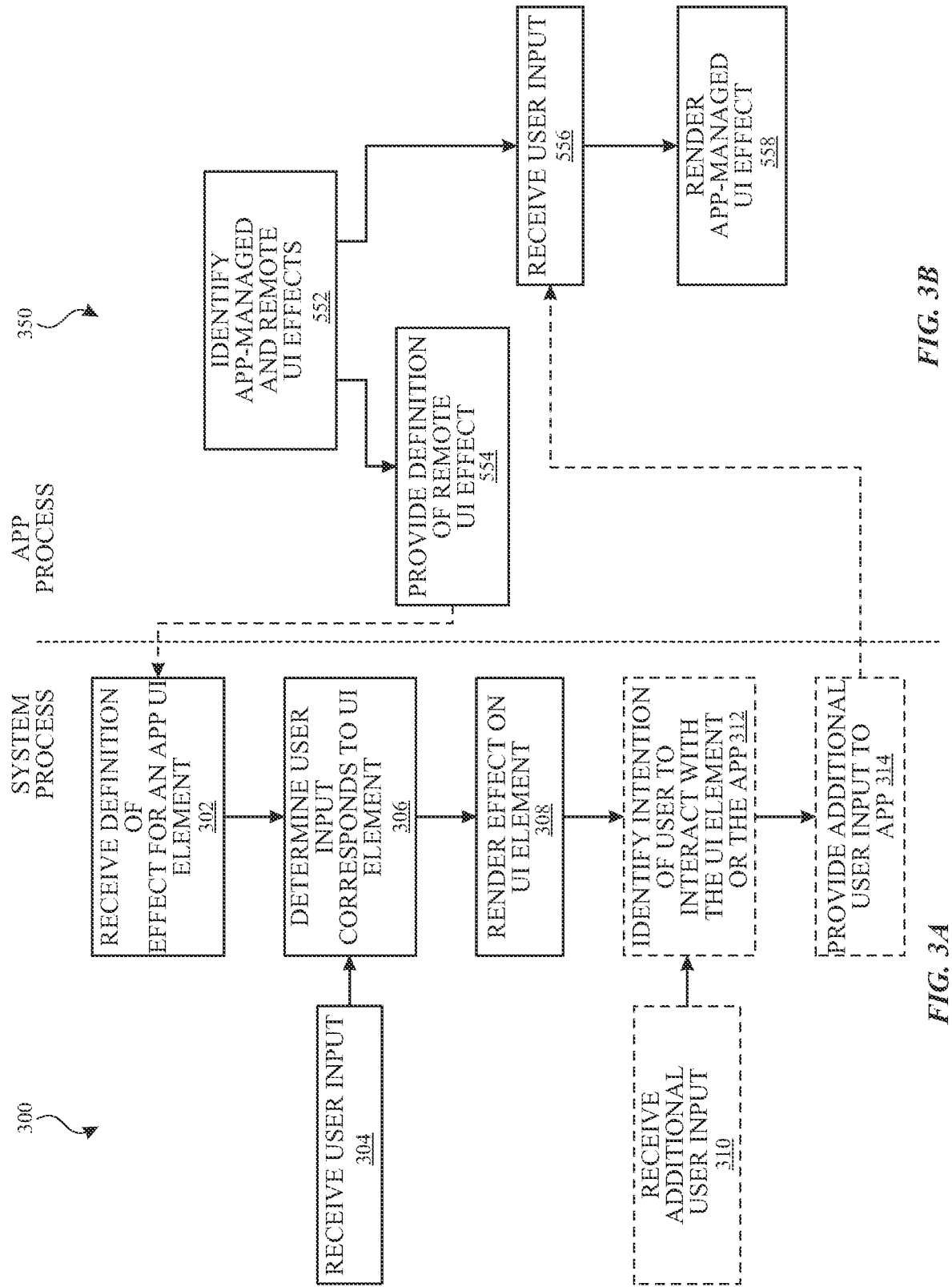
FIG. 3A illustrates an example method for rendering UI effects, in accordance with aspects of the subject disclosure.
FIG. 3B illustrates an example method for rendering UI effects, in accordance with aspects of the subject disclosure.

FIG. 3A illustrates an example method for rendering UI effects. As shown, the method of FIG. 3A may include receiving, at a system process 300, a definition of an effect for a UI element of an app (box 302). A UI element of an app may include any or all of: an element of a UI window, such as a virtual button, a virtual switch, a virtual slider, a virtual list (e.g., a drop-down list), a text-entry field, a collection view (or a cell thereof) or a table view (or a cell thereof), other interactive virtual content with which the user can interact to provide user input to the app, or non-interactive virtual content. A UI element of an app may be a two-dimensional element or may be a rendering of a three-dimensional (3D) model. A UI element of an app may include static virtual content (e.g., an image, text, static shapes, boundaries, colors, or the like, and/or may include dynamic virtual content such as videos and/or 2D or 3D animations. A UI element may include virtual content that is displayed within or as part of a surrounding UI window, or may be standalone virtual content that is displayed separately from other virtual content and/or other UI elements of an application. User input may be received (box 304) by the system process 300, and when it is determined (e.g., by the system process) that the received user input corresponds to the UI element of the received effect definition (box 306), then the effect may be rendered (e.g., by the system process 300) on the UI element (box 308) according to the effect definition. In an aspect, the operations of FIG. 3A may be performed in a system process 300, separate from an app process 350 in which the app runs.

The method of FIG. 3A may include optional additional operations, such as receiving, by the system process 300, additional user input (box 310), different from the user input received in box 304. When a user's intention to interact with the app or a UI element of the app is identified (box 312) by the system process 300, based on the original user input and/or the additional user input, some or all of the user input with which the user intention was identified may be optionally be provided from the system process 300 to (or otherwise made available to) the app process 350 (box 314).

The UI element referenced throughout FIGS. 3A and 3B may be part of an app's user interface. For example, the UI element may be defined by the app, and a purpose of the UI element may be to enable a user to interact with the app (after the user's intention to interact with the app is identified) in one or more implementations. In an aspect, a UI element may include one or more properties, such a location, a size, an orientation, a color, a transparency, or a brightness (as examples) of the UI element, and an effect definition may include a modification of one or more of those properties. For example, an effect definition for a button UI element may include a lift effect to raise a location property of the button and a brightening effect to increase a brightness property of the button. Furthermore, an app UI element may include predefined "remote states," where a remote state corresponds to predefined value(s) of the UI element's properties. A remote state of an app's UI element may be considered remote in that, while the app may define the UI element, its properties, and its remote states, only system components in a separate system process (such as rendering system 270 and effects component 280) may manage or have knowledge of the UI element's remote state. This may allow a user's preliminary interactions with the UI element to be rendered while remaining private from the app by preventing the app from discovering which remote state the UI element is in at any particular time.

In an aspect, the UI elements referenced throughout FIGS. 3A and 3B may also be obtained directly from the app or from alternate sources, such as the UI frameworks and file formats described above or from the operating system. These UI elements provided by alternate sources may act as a portion of an app's user interface (such the user interface of app 260 of FIG. 2). UI elements from alternate sources may have associated properties and "remote states" defined by the alternate source and/or defined by the app using it. For example, even though a UI element may originate from an alternate source, such a UI element may still be managed by the app using it to cause a system process to render remote effects while retaining privacy from the managing app.

In an aspect, UI elements may be specified as a layer tree or as a render tree. For example, application 260 may provide a layer tree or render tree of UI elements to rendering system 270, and application 260 may provide a definition of effects 252 including a layer tree or render tree of UI elements to an operating system or other component managing out-of-process UI effects.

The effect definition (box 302) may be received from a particular app running in an app process 350, and may describe an effect to be rendered on a UI element belonging to that particular app. However, implementations of this disclosure are not so limited. For example, the effect definition received in box 302 may be received indirectly from other sources, the effect definition may be a predetermined effect, or UI element may be a predetermined UI element. In one example, a button UI element may be predefined, and a "lift" effect may be predefined to occur when a gaze, hand, or pointer user input is determined to correspond to (e.g., to hover at or near the predefined button UI element. In the case of predefined effects and/or predefined UI elements, the received effect definition may include a reference to the predefined elements without fully defining such element.

In an aspect, an effect definition may identify an effect to be rendered for a UI element by identifying a remote state (with predefined rendering property values) to be used when user input is determined to correspond to the UI element. In a further aspect, the effect definition may identify an animation to be used when transitioning between predefined remote states.

User input (such as is received in boxes 304 or 310 of FIG. 3) may include many types of input from a user. For example, in addition to user inputs received from user input devices such as a mouse, a keyboard, and/or an audio input device, received user input may also include location and/or orientation tracking of a user's body or body part (such as a fingertip or hand), gesture recognition (such a hand shape, hand motion, and/or a facial expression), or a location of a user's optical gaze (e.g., a gaze location 114). User input may include time or speed measurements, such as a gaze-dwell duration measuring a time duration that a user's gaze remains on or within a certain distance of a particular location or UI element, or hover-dwell measuring a time duration that a user hand or other body part remains within a certain two-dimensional or three-dimensional distance of a particular location or UI element.

In as aspect, UI effects (such as is defined in box 302 and rendered in box 308 of FIG. 3) may include any rendered output a user can sense, including audio, imagery, and/or tactile effects. An example of an audio effect on a UI element may include an audible sound designed to be perceived as emanating from the location of UI element, or a distortion of audio already emanating from the UI element before rendering of the audio effect. As an example of an imagery effect, a UI element may be displayed or otherwise visually presented to a user prior to rendering of the effect, and the rendered effect may change the appearance or location of UI element. For example, a glow effect may cause an existing UI element to glow. A highlight effect may add a new visual cue, such as a circle or check mark, near the location of the UI element. In an aspect, an effect definition may specify an "inverse" rendering effect, in which the specified effect is generally rendered except when a user input corresponds to the UI element.

In an aspect, correspondence between a user input and a first UI element (box 306) may include identifying a plurality of user interface elements that the UI element may interact with, and then determining that the plurality of identified UI elements includes the first UI element. For example, user input may be a gaze location. The system process may perform a hit-test process including identifying a list of potential UI elements that the user may be attempting to interact with, such as by identifying all UI elements from all applications that are located within a threshold distance of the gaze location and/or identifying all UI elements with which gaze direction intersects. If an effect definition includes an app UI element that is in that list, then the corresponding effect may be rendered on that app UI element. In a use case in which the gaze direction intersects with multiple UI elements each having effect definitions, the system process may render the effect on the UI element, among the multiple UI elements, that is displayed to appear closest to the user among the multiple UI elements and/or on the UI element, among the multiple UI elements, with which the gaze location most centrally intersects.

In an aspect, a single effect may be defined for a group of UI elements. For example, when user input correspondence is determined (306) for any of the UI elements in the group, the defined effect may be rendered on all UI elements in the group. In another example, user input correspondence in box 306 may be determined by only a subset of the UI elements in the group. The definition of an effect for a group of UI elements may include an indication of a which subset of UI elements in the group to hit-test against. If a user input location (such as a location a user's gaze or hand gesture) is within a certain proximity (e.g., a predefined distance defined by the system process or in the effects definition) of any element in the indicated subset of UI elements, the effect may be rendered on all UI elements in the group.

In an aspect, a single effect definition may define a group of rendered effects. When correspondence to the UI element is determined (box 306), the UI element may be rendered with multiple different effects (box 308). For example, an effect definition for a button may include a combination of a lift effect (e.g., a movement of the button in a direction opposite pressing the button), a glow effect (e.g., brighten) and an audio cue (e.g., an audio tone emanating from the button).

In an aspect, an effect definition may combine multiple aspects described above. For example, a single effect definition may include multiple UI elements, multiple effects to render, and/or multiple types of user input that may trigger the rendering of the one or more effects.

In an aspect, only a summary or a subset of user input may be provided to the app (box 314), even after identifying a user's intention to interact with the app (box 312). For example, once a user's gaze-dwell time on an app button is greater than a threshold, the intention to interact with the app may be identified. However, instead of providing the user's gaze location or gaze dwell time to the app, the app may be provided with an indication that the user intended to press the app button without providing the app any knowledge about the user's gaze.

A list selection UI may be used to illustrate a more complex example of out-of-process effects that combines various aspects described above. A common list-selection UI task may include presenting a list of several options to a user, including an indication of a current selection. Examples of a list selection UI include a "combo box" in MacOS or a "drop-down list box" in Windows. Each of the options in the list may be rendered, for example, as a visual box containing text describing the option, and the list may be presented as a row of text boxes all without a highlight except a current selection highlighted with a first color.

In an example out-of-process implementation of a list selection UI, an application 260 may provide definitions of UI elements 250 including a row of text boxes to rendering system 270. The definition of each text box may include three predefined remote states including: 1) an unselected (idle) remote state with a highlight property set to a first color (or no highlight); 2) a current selection remote state with the highlight property set to a second color; and 3) a preliminary selection remote state with a highlight property set to a third color. The application 260 may further provide an indication that a first text box of the list is a current selection and application 260 may provide effects component 280 with definition of effects 252 that indicate how preliminary user input should affect the remote state of the text boxes. The rendering system 270 may render the list of text boxes each with its corresponding remote state, and the rendering system 270 may provide the definitions of text boxes via UI elements 258 message to the effects component 280 along with the current locations of each text box. Effects component 280 may use these definitions to manage the remote states of the text boxes. When effects component 280 receives user input including a location (e.g., a gaze location or location of a hand gesture), and effects component 280 may perform hit-testing of the user input location against the locations of the text boxes to determine a correspondence between the user input and one of the rendered text boxes. When the user input location correspond to the second text box in the list which is different from the currently selected first text box, the effects component 280 may cause rendering system 270 to render an effect 256 including a change in highlight property from the unselected remote state to a preliminary selection remote state, without notifying the app of the user input location or the change in remote state and highlight property of the second text box.

Alternately or in addition to the preliminary selection above, when user input indicates a user's completed selection, the app may be notified of the user's intent to change the current selection in the list. For example, after rendering the preliminary selection above and in response to receiving additional user input (box 310) that identifies the user's intention to change the current selection to the second box (for example, when a gaze-dwell duration threshold is exceeded on the second box, or a button press gesture occurs on the second box), the app may be notified of the user's intent to change the current selection in the list.

In an aspect, a remote effect definition may specify an animation for rendering when a transitioning between remote states. For example, in the list selection UI example above, a remote state transition animation may be defined from the unselected remote state to the preliminary selection remote state to include a fading transition from the first color of highlight (no highlight for idle state) to the third color of highlight (for preliminary selection state).

FIG. 3B illustrates an example method for rendering UI effects, in accordance with aspects of the subject disclosure. As shown, the method of FIG. 3B may include identifying, by an app process 350, app-managed rendering effect(s) and remote rendering effect(s) (box 552) for corresponding UI elements. A definition of the identified remote rendering effect(s) may be provided, by the app process 350, to a remote effect rendering service provider (box 554, such as rendering system 270 and/or effects component 280 of FIG. 2). User input may be received (box 556), by the app process 350, for a UI element with a corresponding app-managed effect. The app-managed UI effect may be rendered (box 558) by the app process 350 on its corresponding UI element.

In an aspect, the operations of method of FIG. 3B may be performed in an app process 350, separate from a system process 300 in which the remote/out-of-process UI effects are managed. In another aspect, the method of FIG. 3A may be an example method for providing a remote effect rendering service, and the effect definition provided in box 554 may be received at box 302. In yet another aspect, the additional user input provided in box 314 may be received at box 556.

In other aspects, effects for preliminary user interactions may be identified as remote-UI effects, while effects for confirmed user inputs may be identified as app-managed-UI effects (box 552). In the list-selection UI example described above, the preliminary selection rendering effect may be identified as a remote-UI effect, while a completed selection rendering effect may be identified as an app-managed UI effect.

In one or more implementations, delegate-based methods may be provided to dynamically update hover effects based on view state changes of a UI element. In one or more implementations, delegate-based methods may be provided to customize hover effect behaviors dynamically. In one or more implementations, additional customized definitions of remote effects may be provided (e.g., to provide the ability to match effects on multiple views). In one or more implementations, multiple hover effects may be composed or added to a single view (e.g., a single UI element). In one or more implementations, automatic default shapes may be provided for some or all effects, such as for hover effects, focus effects, drag-and-drop effects, context menu previews, etc. In one or more implementations, a shape definition may define a shape as a clip shape (e.g., to automatically set appropriate properties on a given layer, such as by automatically setting a corner radius for a rounded rectangle, or a mask for a custom shape). In one or more implementations, a shape for an effect may be resolved based on one or more device properties (e.g., based on a corner radius of a device display) or based on a container shape (e.g., the shape of a super view in which the shape will be framed). In one or more implementations, hover effects may be defined based on a type of content (e.g., images or video) associated with a UI element and/or based on an input type (e.g., gaze, hand, or pointer-style) of a user input. In one or more implementations, effects may be defined to reveal additional UI information and/or content (e.g., responsive to a gaze at a particular location), to expand a UI element to display more content, and/or to scale up or translate a UI element. In various implementations, out-of-process (e.g., remote) effects and/or application-managed effects may be defined and/or implemented using application programming interfaces (APIs) and/or block-based programming.

In one or more implementations, an application process (e.g., app process 202) may identify (e.g., at box 552) an application-managed user interface (UI) effect and a remote-UI effect for a first UI element; provide, to a system process (e.g., system process 204), a definition of the remote-UI effect and an identification of the first UI element. The application process may receive a user input corresponding to the first UI element; and rendering the application-managed UI effect on the first UI element. In one or more implementations, the user input may include a confirmed user input (e.g., a confirmed user input to the first UI element, as determined by hit-testing) that has been confirmed, by the system process, following a preliminary user input corresponding to the first UI element (e.g., a preliminary user input to the first UI element, as determined by hit-testing) and for which the remote-UI effect was rendered by the system process. For example, the confirmed user input may include a confirmed user input to a second UI element generated, by the system process, responsive to the preliminary user input to the first UI element. In one or more use cases, the first UI element may include a list-selection UI that is expanded, responsive to the preliminary user input, to include selectable options, at least one of the selectable options including the second UI element. In one or more other use cases, the first UI element may represent an option in a list-selection UI, the remote-UI effect may correspond to (e.g., may be rendered in response to a detection of, and may indicate) a preliminary selection of the option in the list-selection UI, and the application-managed UI effect may correspond to (e.g., may be rendered in response to a detection of, and may indicate) a completed selection of the option in the list-selection UI.

In various examples described herein, examples of remote UI effects include remote effects (e.g., glow, highlight, lift, wiggle, buzz, etc.) that are generated responsive to identifying a preliminary user input that coincides with a user interface element. In another example use case, one or more remote effects may be generated, by a system process (e.g., the system process 300 described herein) and without providing an indication to the application that the remote effects are being generated, responsive to environmental conditions and/or features.

For example, the system process 300 may generate a lighting effect on a virtual content, such as a rendered three-dimensional (3D) model and/or UI element responsive to identifying a lighting condition in a physical environment of the computing device 120. For example, the system process 300 may receive (e.g., in association with box 554) from the application 260, a request for a lighting effect for virtual content (e.g., a rendered 3D model and/or a user interface (UI) element) managed by the application 260. The request for the lighting effect may be a request for a system-defined lighting effect or may include a definition (e.g., a declarative definition) of the lighting effect as defined by the application 260. For example, the lighting effect may include brightening, dimming, or otherwise modifying the appearance of various parts of the UI element based on a lighting condition (e.g., a direction and/or a brightness of one or more light sources) in the physical environment. For example, the system process 300 may identify the lighting condition of the physical environment while the virtual content is displayed by the computing device 120. Identifying the lighting condition may include receiving sensor data and/or images (e.g., at box 304, along with or instead of the user input) from one or more cameras and/or sensors. The system process 300 may then render, based on the identified lighting condition and without providing the lighting condition to the application 260, the lighting effect on the virtual content.

As another example, the system process 300 may generate a mirroring effect on virtual content (e.g., a rendered 3D model and/or a user interface (UI) element), in which the mirroring effect mirrors one or more portions of the physical environment of the computing device 120. For example, the system process 300 may receive (e.g., in association with box 554) from the application 260, a request for a mirroring effect for virtual content managed by the application 260. The request for the mirroring effect may be a request for a system-defined mirroring effect or may include a definition (e.g., a declarative definition) of the mirroring effect as defined by the application 260. For example, the mirroring effect may include displaying an image of a portion of the physical environment so as to appear reflected from a portion of the (e.g., a rendered 3D model and/or a user interface (UI) element) (e.g., a reflective surface or texture on a rendered 3D model and/or UI element). For example, the system process 300 may identify, while the user interface element is displayed by the computing device 120, one or more features of a physical environment of the computing device 120 (e.g., by capturing one or more images of one or more portions of the physical environment). Identifying the one or more features may include receiving sensor data and/or images (e.g., at box 304, along with or instead of the user input) from one or more cameras and/or sensors, and identifying (e.g., at box 306) the one or more features using the sensor data and/or images. The system process 300 may then render, based on the identified one or more features and without providing the one or more features of the physical environment to the application, a reflection of the one or more features of the physical environment on the UI element. Rendering the reflection of the one or more features on the virtual content may include, for example, obtaining an image of a portion of the physical environment, modifying (e.g., rotating, scaling, warping, distorting, or the like) the image based on the position and/or shape of virtual content and/or the reflectivity of the surface of the virtual content, and rendering the modified image over some or all of the virtual content. For example, virtual content in the form of a reflective sphere can be provided by the application 260, and the system process 300 can display a distorted mirror image of the physical environment on the surface of the reflective sphere, without providing any information about the physical environment to the application 260.

In one or more implementations, a system process of an electronic device, such as the computing device 120, may provide one or more other out-of-process services for an application, such as the application 260 (e.g., without providing information about the services to the application, which may help preserve the privacy of the user of the electronic device with respect to the application). For example, in one or more implementations, the system process 300 may provide out-of-process anchoring for one or more applications at the computing device 120.

For example, in one or more implementations, the system process 300 may receive, from an application such as application 260, a request (e.g., in association with box 554) to anchor virtual content (e.g., a rendered 3D model and/or a UI element, such as a UI element for which one or more out-of-process effects can also be provided) of the application to a physical object in a physical environment of the computing device 120. The system process 300 may then anchor (e.g., as part of the rendering at box 308), responsive to the request and without providing information associated with the physical object or the physical environment to the application 260, the virtual content to the physical object. As examples, a physical object that may be requested for anchoring of virtual content of an application may include a table, a wall, a chair, a floor, a horizontal surface, a vertical surface, a hand, a finger, or any other physical object that can be identified by the computing device 120. For example, the anchoring may be provided by the system process without providing transforms, images, sensor data, or any other information describing the physical object or the physical environment or the location of the physical object in the physical environment to the application. For example, the system process may provide the requesting application with only an indication of anchoring success or failure.

In one or more implementations, anchoring the virtual content to the physical object may include identifying, by the system process 300, the physical object in the physical environment (e.g., using sensor data, one or more cameras, and/or computer vision operations); receiving, from the application 260 at the system process 300, rendering information for the virtual content; and rendering, by the system process using the rendering information, the virtual content at a location on a display of the device that corresponds to a location of the physical object in the physical environment (e.g., a location on the display 115 that, when the display 115 is viewed by a user, causes the virtual content to appear to be at the location of the physical object in the physical environment). In various implementations, the rendering information received from the application 260 may include a rendered 3D model, a rendered UI element, or instructions (e.g., a layer tree) for rendering the 3D model or UI element. Anchoring the virtual content to the physical object may also include detecting, by the system process 300 (e.g., using sensors and/or cameras of the computing device 120), motion of the physical object relative to the computing device 120; and modifying, by the system process 300 and without providing information about the motion of the physical object to the application, the rendering of the virtual content to track the motion of the physical object relative to the computing device 120.

In one or more implementations, the system process 300 may provide, to the application 260, a confirmation that the virtual content has been anchored to the physical object, without providing the information associated with the physical object or the physical environment to the application.

In one or more implementations, virtual content that is anchored to a physical object by the system process 300 in an out-of-process anchoring operation may be non-interactive virtual content that includes contextual information about the physical object. In one or more implementations, the physical object may include an image in the physical environment. For example, the image may include a logo (e.g., a logo of a company, a team, or a product). In one or more implementations, the virtual content that is anchored to a physical object by the system process 300 in an out-of-process anchoring operation may include contextual information for the physical object, such as contextual information for a logo (e.g., company information or product information).

For example, in one or more use cases, a request from the application 260 to the system process 300 to anchor virtual content to a physical object in the physical environment of the computing device 120 may include an electronic version of the image. The system process 300 may, responsive to the request including the electronic version of the image: monitor, using the electronic version of the image, the physical environment for the image during operation of the device during a period of time prior to displaying the virtual content. For example, in a use case in which the image includes a logo, the electronic version of the image may include an electronic version of the logo, and the system process 300 may monitor (e.g., using computer vision operations on camera frames captured by the camera(s) 117) the physical environment for an image that matches (e.g., within a threshold) the electronic version of the image.

The system process 300 may also display virtual content responsive to detecting the image in the physical environment during the monitoring. For example, in the use case in which the image includes the logo, the system process 300 may (e.g., using the computer vision operations) detect a product (or an advertisement or other physical object) in the physical environment on which the logo is printed or otherwise displayed, and the virtual content that is responsively displayed may include information about a company or other products to which the logo corresponds. In various implementations, the information about the company or other products may be stored locally at the computing device 120 prior to detecting the logo in the physical environment (e.g., to prevent information about the detection of the logo in the environment of the user from being transmitted off device, to protect the privacy of the user), or (e.g., with permission from the user) may be obtained from a server or other remote device responsive to the detection of the logo in the physical environment, and prior to display. Subsequently, the system process 300 may continuously update the location of the displayed virtual content to track with the location of the physical object (e.g., by anchoring the virtual content to the physical object outside of the application process), while the physical object remains in the field of view of the computing device 120 (e.g., of one or more cameras of the computing device 120).

In one or more implementations, multiple applications at the computing device 120 can provide anchoring requests to the system process 300. The system process 300 may hold the multiple anchoring requests while monitoring the physical environment for the requested physical objects during operation of the computing device 120, and render virtual content (e.g., one or more anchored rendered 3D models or anchored UI elements) of the multiple applications for display when a respective requested physical object for a respective application is detected.

Figure 4:
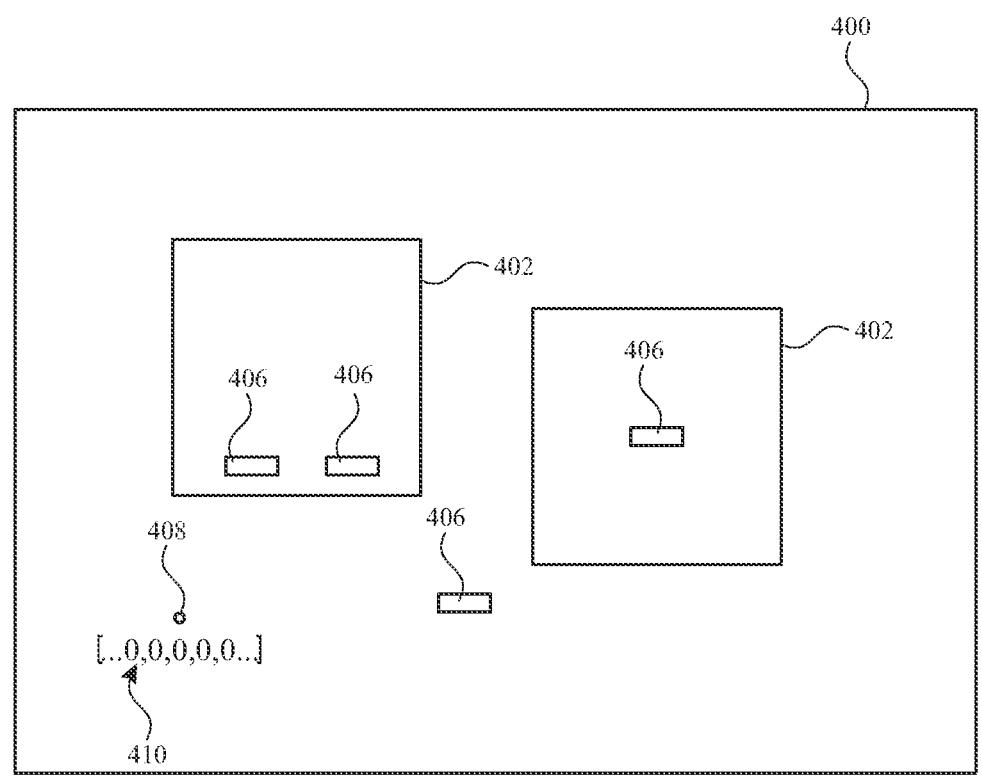
FIG. 4 illustrates an example use case in which an audio stream including null audio content is generated corresponding to a location of a user action, in accordance with aspects of the subject disclosure.

FIG. 4 illustrates an example use case in which one or more UI elements 406 are displayed in a viewable display area 400 of the computing device 120. For example, the display 115 (see, e.g., FIG. 1) of the computing device 120 may be operable to display, in a viewable display area 400 of the display 115, one or more user interface windows 402 each corresponding to an underlying application (e.g., app 260) running at the computing device 120. As shown, each of the user interface windows 402 may include one or more user interface elements 406. As examples, the user interface elements 406 may include virtual buttons, virtual switches, virtual lists (e.g., drop-down lists), tabs, scrollbars, application icons, and/or other interactable elements. As shown in FIG. 4, in one or more implementations, a user interface element 406 may be displayed separately from a user interface window 402. As described herein, a system process 300 may render one or more effects for a user interface element 406 when a user input to the computing device 120 corresponds to a UI element 406 (e.g., when the user's gaze location 114 falls within the boundary of the UI element 406 or within a range of the boundary of the UI element 406, and/or when a user's hand or finger (or other pointer) hovers over a location within the boundary of the UI element 406 or within a range of the boundary of the UI element 406, such as for a predetermined amount of time). These effects can be out-of-process effects, defined by the underlying application for the UI element 406, rendered without providing user information (e.g., the location of the user input) to the application.

As described herein, out-of-process effects associated with UI elements, such as UI elements 406, may include audio effects. For example, when a UI element 406 is implemented as a virtual button, a user's hand and/or gaze at or near the button may cause a declaratively defined sound, such as a clicking sound, a lifting sound, a buzzing sound, a bouncing sound, or other sound, to be output by one or more speakers (e.g., a speaker array including speakers 117) of the electronic device, such that the sound is perceived by a user of the electronic device to be emanating from the location of the UI element 406. These audio effects can be provided along or in combination with visual effects such as a highlight or glow effect, by the system process 300.

In addition to preserving user privacy with respect to the application underlying a UI element 406, providing these audio effects as out-of-process effects, as described herein, can be beneficial in, for example, reducing a latency between a user action associated with a UI element 406 and the output of the corresponding audio effect. For example, if, instead, an audio effect is generated by the application for which the UI element 406 is displayed, a delay may occur due to the time used for sending the user input information to the application, the application generating the sound, and the sound being output from the speaker(s). Moreover, in the examples described herein in which the audio output is generated so as to be perceived as emanating from the location of the UI element 406, the location of the UI element 406 at which the user input is occurring is used in the generation of the audio effect. Pre-warming an audio output by the application could reduce a portion of this latency, but applications running on a device may not have access to location information for the user input, and may therefore be unable to pre-warm a sound for its own UI element(s) in some implementations.

Even in the case of providing out-of-process audio effects generated by the system process 300, the dependency of the audio output on the location of the UI element may result in a latency between a user action and a resulting output of an audio effect, since the location of the UI element for which an audio effect is to be generated is not known until the user action occurs at or near that location.

One option for reducing such a latency would be to pre-warm, by the system process, individual respective audio streams for all UI elements 406 that are displayed. However, this can be undesirably costly in terms of processing power and/or memory usage (in some cases), particularly when there are multiple (e.g., many) UI elements 406 displayed concurrently. Another option would be to start an audio stream each time the user's gaze, hand, or finger intersects with the location of a UI element. However, this option still includes a latency and can result, particularly in a use case in which multiple (e.g., many) UI elements are displayed and a user is looking around the display area or gesturing with their hand without intending to interact with the UI elements, in a large number of unused audio streams being generated, which can also be undesirably costly in terms of processing power and/or memory usage (in some cases).

Figure 5:
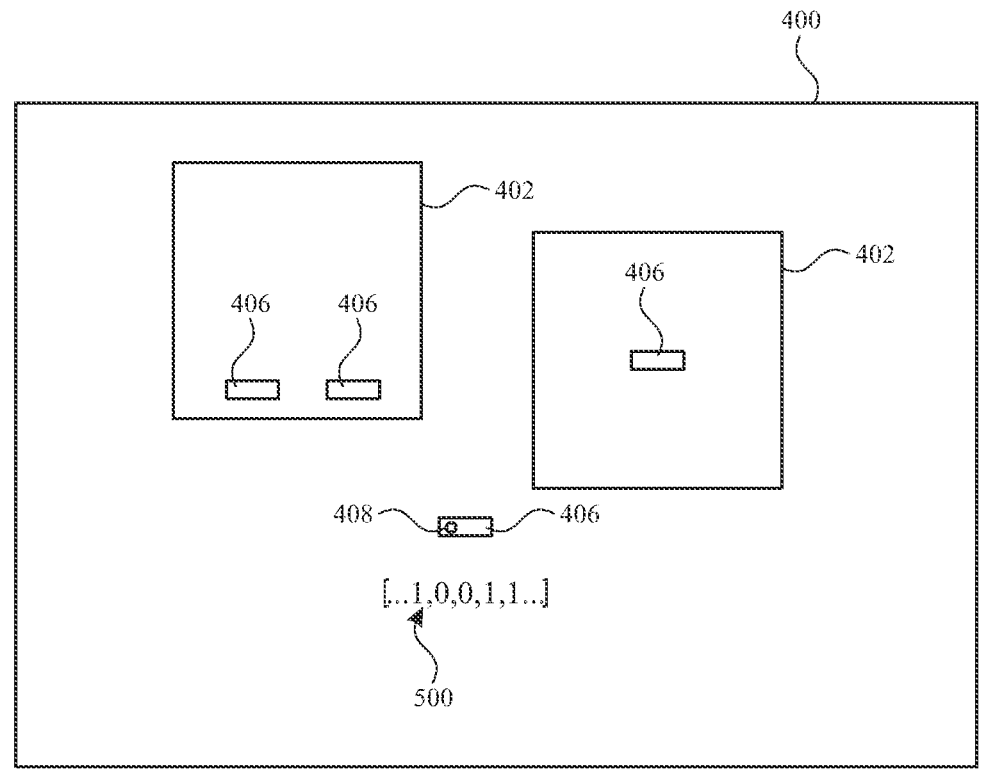
FIG. 5 illustrates an example use case in which an audio stream being generated to be perceived at a location of a user action is used to generate an audio effect for a user interface element, in accordance with aspects of the subject disclosure.

In accordance with aspects of the subject technology, a running audio stream may be continuously generated, such that any non-zero audio content in the audio stream is perceived to be at (e.g., emanating from) a location 408 corresponding to a user action (e.g., the location of a hand or finger of the user and/or a gaze location 114 at which the user's eyes are gazing at any given time), and the running audio stream may follow the location 408 as the location 408 of the user action moves around. As indicated in FIG. 4, when no UI element is present at the location 408 of the user action, the audio content of the continuously running audio stream may be null audio content 410 that includes only zeros (e.g., and silence may be correspondingly output by the speakers 117 to be perceived at the user action location 408). As illustrated in FIG. 5, when the user action location 408 corresponds (e.g., according to hit testing as described herein, such as in connection with box 306 of FIG. 3A) to the location of a UI element 406, audio content 500 (e.g., non-zero audio content) for the specific sound for that UI element 406 can be inserted into the running audio stream (e.g., replacing the null audio content 410 in the audio stream) that is being generated to be perceived at that location for output. For example, the audio content 500 may be declaratively defined by an application process 350, and the declarative definition of the audio content 500 can be provided to the system process 300, as described herein, prior to output of the audio content 500. In this way, the audio effect for the UI element 406 (defined in the audio content 500) can be immediately rendered (e.g., box 308 of FIG. 3A) and output by the speakers 117, for perception by the user at the location of a user interface element 406, when the user action location 408 coincides with the location of a user interface element 406.

In one or more implementations, the computing device 120 may include a buffer corresponding to the continuously running audio stream, and may apply, based on the location 408 of a user action (e.g., the gaze location 114 of the user's gaze and/or the location of the user's hand or finger), a spatialization processing to the audio content (e.g., the null audio content 410 or the audio content 500) in that buffer, to generate audio output including the content of that buffer to be perceived at the location 408 of the user action. For example, the spatialization processing may generate multiple audio signals that are provided to multiple respective speakers 117 of the computing device 120 that cause the multiple speakers 117 to cooperate to output the audio content in the buffer such that the audio output from the multiple speakers 117 is perceived, by the user of the computing device 120, to be emanating from the location 408 of the user action.

In the example of FIG. 4, when the location 408 of the user action does not intersect (e.g., as determined using hit testing other methods as described herein) with a UI element 406, the audio content in the buffer be may zeros (e.g., null audio content 410). In this use case, the spatialization processing may be applied to the zeros in the buffer and, although the spatialization processing has been applied to the null audio content 410 and although the audio signals have been provided to the speakers to cause the null audio content to be output for perception at the location 408, because the null audio content is zero, the user will not receive any audio output from the speakers 117. In the example of FIG. 5, when the location 408 of the user action intersects with a UI element 406 (e.g., as determined using hit testing other methods as described herein), the buffer may be filled with the audio content 500 (e.g., non-zero audio content values) corresponding to the sound of that UI element 406, and the spatialization processing may be applied to the audio content 500 and the resulting audio signals to the speakers may cause the audio content 500 to be perceived as being output at the location 408.

In this way, when the user 110, for example, gazes at a virtual button, a sound corresponding to the virtual button may be inserted into an already active audio stream, that is already generating a spatial audio output for perception at approximately the location of the button (e.g., at the location 408 that corresponds to the location of the UI element 406). In this example, the location input for the spatialization processing may be switched from the location 408 of the user action (e.g., the gaze location) to the location of the virtual button (e.g., the center of the button) when, or just before, the audio content for the button is inserted into the audio stream.

Figure 6:
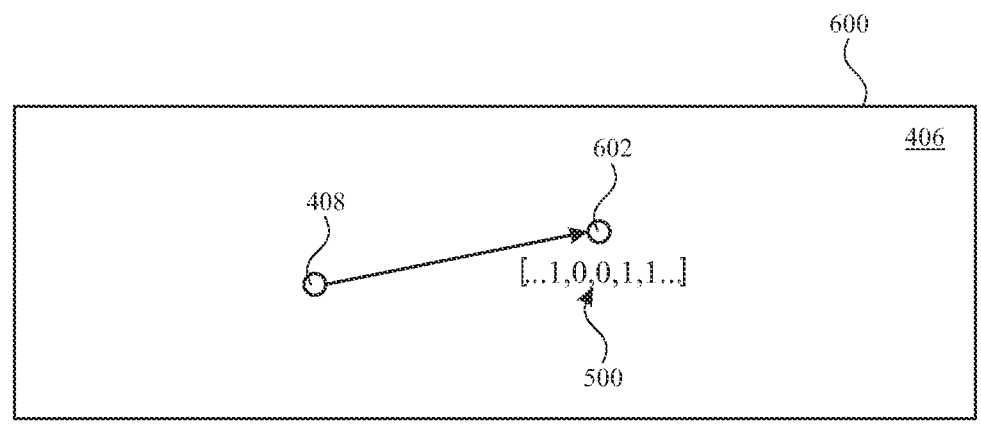
FIG. 6 illustrates an example use case in which a location of a user action is replaced with a location of a user interface element, in accordance with aspects of the subject disclosure.

For example, FIG. 6 illustrates an example in which the location 408 of the user action is within a boundary 600 (e.g., a displayed visible boundary or an un-displayed boundary that is not visible to the user) of a UI element 406. As illustrated by FIG. 6, the location that is input to the spatialization processing (to cause the sound generated according to the audio content 500 to be perceived as emanating from a particular spatial location in the physical environment of the user) may be switched from the location 408 of the user action to the location 602 of the UI element 406. In the example of FIG. 6, the location 602 of the UI element 406 is shown as being at the center of a rectangular UI element, but this is merely illustrative, and the shape and/or size of the UI element 406 may be any suitable shape and/or size, and the location of the UI element may be any location at or near the UI element 406 (e.g., within the boundary 600 of the UI element 406). In this example, because the jump from location 408 to the location 602 is small (e.g., smaller than the displayed size of the UI element 406, as the jump is not initiated until the location 408 coincides with at least part of the UI element 406), the location jump may be imperceptible to the user even if the location jump occurs while the sound corresponding to the audio content 500 for the UI element 406 is being output (e.g., by the speakers 117).

In one or more implementations, once the audio content for a particular UI element is inserted into the audio stream (e.g., loaded into the buffer for that audio stream), and the location of that audio stream is set to the location of that particular UI element, a new continuous audio stream may be generated that moves with the location 408 of the user action (e.g., moves with the user's gaze as the user's gaze moves away from a virtual button after a virtual button has been clicked and the clicking sound of the virtual button is output using the prior audio stream that was snapped to the location 602).

Figure 7:
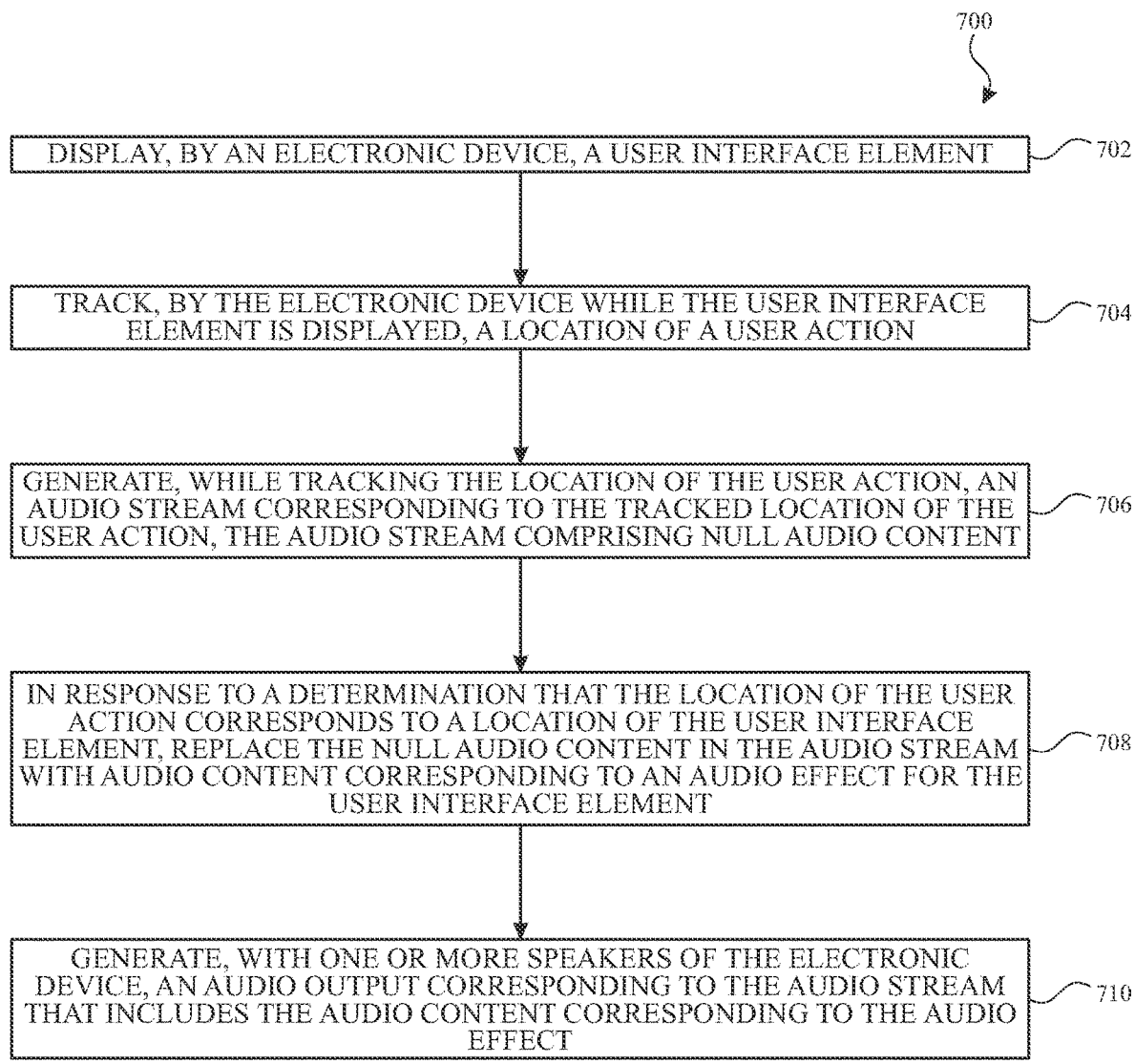
FIG. 7 illustrates a flow chart of illustrative operations that may be performed for providing out-of-process audio effects, in accordance with aspects of the subject disclosure.

FIG. 7 illustrates an example process 700 for providing out-of-process audio effects, in accordance with one or more implementations. For explanatory purposes, the process 700 is primarily described herein with reference to the computing device 120 of FIG. 1. However, the process 700 is not limited to the computing device 120 of FIG. 1, and one or more blocks (or operations) of the process 700 may be performed by one or more other components of other suitable devices. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

In the example of FIG. 7, at block 702, an electronic device (e.g., the computing device 120) may display (e.g., using display 115) a user interface element (e.g., a UI element 406). For example, the user interface element may be displayed within a user interface window (e.g., a user interface window 402 as in the examples of FIGS. 4 and 5) for an application (e.g., app 260), or may be displayed without a surrounding or associated UI window. The user interface element may be managed by an underlying application (e.g., app 260) running at the electronic device.

At block 704, the electronic device may track (e.g., while the user interface element is displayed) a location (e.g., location 408) of a user action. For example, the location of the user action may include a gaze location (e.g., gaze location 114). As another example, the location of the user action may include a location of at least a part of a hand of a user of the electronic device. Tracking the location of the user action may include tracking the location of the user action using one or more cameras and/or other sensors of the electronic device (e.g., including one or more cameras capturing images of the eye(s) of the user and/or one or more cameras capturing images of the hand(s) of the user).

At block 706, while tracking the location of the user action, the electronic device may generate an audio stream corresponding to the tracked location of the user action, the audio stream including null audio content (e.g., zeros, such as in null audio content 410). For example, generating the audio stream may include applying a spatialization process, based on the tracked location, to the null audio content. In one or more implementations, generating an audio stream may include loading audio content (e.g., the null audio content 410) into a buffer, providing the location of the user action to a spatialization process, applying the spatialization process to the audio content in the buffer to generate one or more audio output streams for one or more respective speakers, activating one or more audio components (e.g., amplifiers, filters, etc.), and providing the one or more audio streams (e.g., including the audio content having had the spatialization process applied) through the one or more audio components for output by one or more speakers.

In one or more implementations, the electronic device may determine, prior to generating the audio stream, whether to generate the audio stream. For example, the electronic device may determine that the audio stream is to be generated when certain conditions of the electronic device are met. For example, the conditions may include the electronic device being held, worn, or otherwise engaged with by a user, that other audio content is already being generated, that the location of the user action recently contacted or passed over or within a predetermined range of a UI element having an audio effect (e.g., the recency determined using a keep-alive timer, such as a timer that counts down to zero from a predetermined value and that is initiated by the contact or pass-over of the location of the user action), that at least one user interface element having an audio effect is displayed, and/or that the electronic device is not thermally limited (e.g., when a temperature of the electronic device or a portion thereof is below a temperature threshold). In one or more implementations, the electronic device may cease generating the audio stream if one or more of the above conditions is no longer met while the audio stream is being generated.

At block 708, in response to a determination that the location of the user action corresponds to a location (e.g., location 602) of the user interface element, the electronic device may replace the null audio content in the audio stream with audio content (e.g., audio content 500) corresponding to an audio effect for the user interface element. For example, determining that the location of the user action corresponds to the location of the user interface element may include performing hit testing, as described herein (e.g., in connection with box 306 of FIG. 3A), to determine whether the location of the user action is, for example, within a boundary (e.g., boundary 600 of FIG. 6) of the user interface element (e.g., for at least a threshold amount of time).

At block 710, the electronic device may generate, with one or more speakers (e.g., speakers 117) of the electronic device, an audio output corresponding to the audio stream that includes the audio content corresponding to the audio effect. For example, generation the audio output may include applying the spatialization process (e.g., the spatialization process that was applied to the null audio content), based on the location of the user interface element, to the audio stream including the audio content corresponding to the audio effect; and operating multiple speakers of the electronic device to generate the audio output according to the audio stream that includes the audio content corresponding to the audio effect and that has had the spatialization process applied based on the location of the user interface element. For example, the audio effect that has had the spatialization process applied based on the location of the user interface element may be configured to be perceived, by a user (e.g., user 110) of the electronic device, to be emanating from the location of the user interface element. In one or more implementations, applying the spatialization process, based on the location of the user interface element may include, in response to the determination that the location of the user action corresponds to the location of the user interface element, replacing the tracked location of the user action with the location of the user interface element in the spatialization process (e.g., and then applying the spatialization process to the audio content). In one or more other implementations, the spatialization process may continue to use the location of the user action even while the location of the user action corresponds to the location of the user interface element.

In one or more implementations, while generating the audio output corresponding to the audio stream that includes the audio content corresponding to the audio effect, the electronic device may generate a new audio stream corresponding to the tracked location (e.g., location 408) of the user action and including the null audio content (e.g., null audio content 410, such as all zeros). For example, the new audio stream including the null audio content may then follow (e.g., due to a continued application of the spatialization processing) the location 408 of the user action away from the location of the user interface element.

In one or more implementations, the process 700 may also include (e.g., prior to displaying the user interface element), receiving, at a system process (e.g., system process 300) of the electronic device from an application (e.g., app process 350) running on the electronic device, a definition (e.g., in the definition of effects 252) of the audio effect for the user interface element (e.g., as described herein in connection with box 302 of FIG. 3A). For example, the user interface element may be managed by the application. For example, generating the audio output may include generating the audio output (e.g., according to the definition) without providing the location of the user action to the application.

In one or more implementations, the process 700 may also include (e.g., after or while generating the audio output) identifying, by the system process based on an additional user input, a user intention to interact with the application (e.g., as described herein in connection with box 312 of FIG. 3A); and when the user intention is identified, providing the additional user input to the application (e.g., as described herein in connection with box 314 of FIG. 3A).

In one or more implementations, the definition of the audio effect may include identification of: one or more remote states of the audio effect, including an idle state, and/or a set of one or more properties and corresponding values for each of the one or more remote states.

In one or more implementations, the definition of the audio effect is included in a set of definitions of effects for the user interface element, the set of definitions including: the definition of the audio effect; and a definition of an animation of the user interface element associated with a transition between two or more different states of the one or more remote states of the effect.

In one or more implementations, the definition of the audio effect may be a declarative definition and the definition of the audio effect may include an identification of the user interface element, an identification of a triggering user action, and an identification of the audio effect (e.g., the audio content 500) to be rendered when the triggering user action corresponds to the user interface element.

In various examples described herein, out-of-process effects are described as being generated by a system process when a user's gaze or hand hovers at or near a UI element displayed in an XR environment. However, it is also appreciated that out-of-process effects can be provided by electronic devices that do not detect gaze and/or hand (e.g., gesture) inputs, and/or that receive user inputs via a trackpad, a touchpad, a mouse, a touchscreen, a stylus, or other pointer-style device or component. For example, an application programming interface (API) that is provided on an XR-capable device may include a subclass that can be used to provide out-of-process effects as described herein (e.g., a set of pointer-specific effects that are a subset of the effects available at an XR-capable device) based on inputs using a pointer-style device. In one or more implementations, one or more subclasses may map to one or more respective legacy effect APIs for effects for pointer-style devices or components. In this way, an API (or other cross-platform compatible definition of an effect that is applicable at various electronic devices having different hardware configurations) may be provided that works automatically across various input types and/or across various platforms, and that works within the privacy constraints presented by an XR system that utilizes user-specific inputs such as gaze, hand, and/or gesture inputs.

In one or more implementations, a subclass may be used to define a hidden style that results in no hover effects with any input type, and a system style that allows a system process to automatically select an effect. For example, a system or automatic style may be useful for expressing a default effect for a UI element that may have one or more other built-in effects (e.g., to allow internal resolution by the view, to choose an appropriate effect for a given context, such as based on a background property). In one or more implementations, an out-of-process or remote effect can be defined to be applied for some input types (e.g., for a gaze or hand input) but not for others (e.g., not for a pointer-style input). In one or more implementations, different out-of-process or remote effects can be defined to be applied for different input types (e.g., glow effect for a gaze input, a lift effect for a hand input, and/or a shape (morphing) effect for a pointer-style input).

In various examples described herein, effects, such as hover effects implemented as glow effects, highlight effects, lift effects, custom effects, effects including shape definitions (e.g., including static and dynamic shape definitions), full UI element effects, sub-element effects, and/or the like are described as being applied as out-of-process or remote effects. However, it is also appreciated that any or all of the various effects and/or features thereof that are described herein can also be provided by an application (e.g., as application-generated effects, such as in use cases in which the trigger for the effect is not a user-specific trigger, such as in use cases in which the trigger corresponds to a pointer-style device or component).

As described above, one aspect of the present technology is the gathering and use of data available from specific and legitimate sources for providing out-of-process audio for electronic devices. The present disclosure contemplates that in some instances, this gathered data may include personal information data that uniquely identifies or can be used to identify a specific person. Such personal information data can include audio data, voice data, demographic data, location-based data, online identifiers, telephone numbers, email addresses, home addresses, encryption information, data or records relating to a user's health or level of fitness (e.g., vital signs measurements, medication information, exercise information), date of birth, or any other personal information.

The present disclosure recognizes that the use of personal information data, in the present technology, can be used to the benefit of users. For example, the personal information data can be used for providing out-of-process audio for electronic devices.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the example of providing out-of-process audio for electronic devices, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
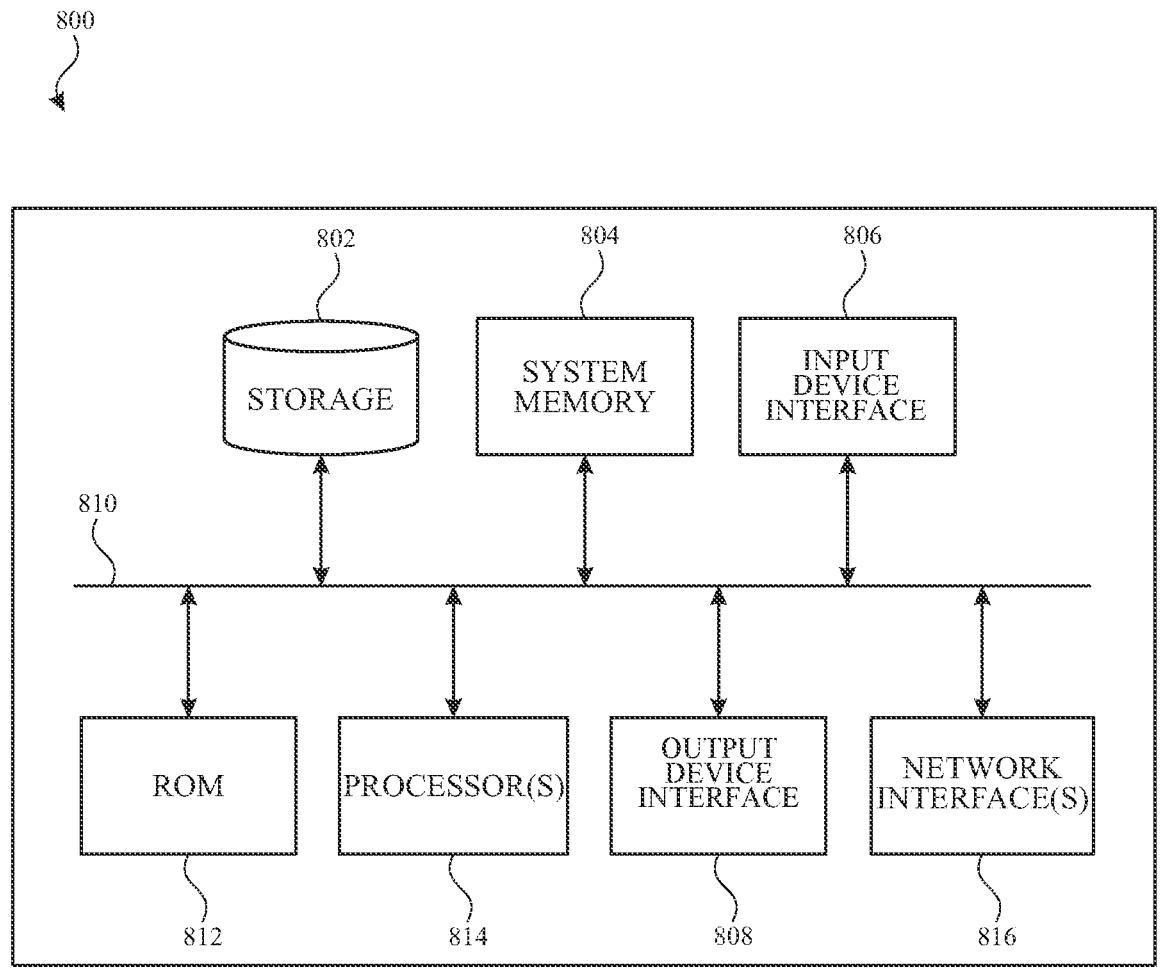
FIG. 8 illustrates an example computing device on which aspects of this disclosure may implemented.

FIG. 8 illustrates an example computing device 800 with which aspects of the subject technology may be implemented in accordance with one or more implementations. The computing device 800 can be, and/or can be a part of, any computing device or server for generating the features and processes described above, including but not limited to a laptop computer, a smartphone, a tablet device, a wearable device such as a goggles or glasses, and the like. The computing device 800 may include various types of computer readable media and interfaces for various other types of computer readable media. The computing device 800 includes a permanent storage device 802, a system memory 804 (and/or buffer), an input device interface 806, an output device interface 808, a bus 810, a ROM 812, one or more processing unit(s) 814, one or more network interface(s) 816, and/or subsets and variations thereof.

The bus 810 collectively represents all system, peripheral, and chipset buses that communicatively connect the numerous internal devices of the computing device 800. In one or more implementations, the bus 810 communicatively connects the one or more processing unit(s) 814 with the ROM 812, the system memory 804, and the permanent storage device 802. From these various memory units, the one or more processing unit(s) 814 retrieves instructions to execute and data to process in order to execute the processes of the subject disclosure. The one or more processing unit(s) 814 can be a single processor or a multi-core processor in different implementations.

The ROM 812 stores static data and instructions that are needed by the one or more processing unit(s) 814 and other modules of the computing device 800. The permanent storage device 802, on the other hand, may be a read-and-write memory device. The permanent storage device 802 may be a non-volatile memory unit that stores instructions and data even when the computing device 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random-access memory. The system memory 804 may store any of the instructions and data that one or more processing unit(s) 814 may need at runtime. In one or more implementations, the processes of the subject disclosure are stored in the system memory 804, the permanent storage device 802, and/or the ROM 812. From these various memory units, the one or more processing unit(s) 814 retrieves instructions to execute and data to process in order to execute the processes of one or more implementations.

The bus 810 also connects to the input and output device interfaces 806 and 808. The input device interface 806 enables a user to communicate information and select commands to the computing device 800. Input devices that may be used with the input device interface 806 may include, for example, alphanumeric keyboards and pointing devices (also called "cursor control devices"). The output device interface 808 may enable, for example, the display of images generated by computing device 800. Output devices that may be used with the output device interface 808 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 810 also couples the computing device 800 to one or more networks and/or to one or more network nodes through the one or more network interface(s) 816. In this manner, the computing device 800 can be a part of a network of computers (such as a LAN, a wide area network ("WAN"), or an Intranet, or a network of networks, such as the Internet. Any or all components of the computing device 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, at a system process of an electronic device from an application running on the electronic device, a definition of an effect for a first user interface (UI) element managed by the application;
   receiving, by the system process while the first user interface element is displayed by the electronic device without the effect applied to the first user interface element, a user input; and
   in response to a determination that the user input corresponds to the first user interface element displayed without the effect, rendering, by the system process and without providing the user input to the application, the effect on the first UI element according to the definition.

2. The method of claim 1, wherein the system process is a separate operating system process from an application process in which the application runs.

3. The method of claim 1, further comprising determining, by the system process, that the user input corresponds to the first user interface element displayed without the effect by:
   determining, by the system process that a gaze direction of a user of the electronic device intersects the first user interface element displayed without the effect.

4. The method of claim 1, further comprising determining, by the system process, that the user input corresponds to the first user interface element displayed without the effect by:
   identifying, by the system process, a hand gesture at a location that is within a range of the first user interface element displayed without the effect.

5. The method of claim 1, further comprising determining, by the system process, that the user input corresponds to the first user interface element displayed without the effect by:
   determining, by the system process that a gaze direction of a user of the electronic device intersects the first user interface element for a period of time greater than a dwell time threshold.

6. The method of claim 1, further comprising determining, by the system process, that the user input corresponds to the first user interface element displayed without the effect by:
   identifying a plurality of UI elements that have a potential interaction with the user input; and
   determining that the plurality of identified UI elements includes the first UI element.

7. The method of claim 1, further comprising:
   identifying, by the system process based on additional user input, a user intention to interact with the application; and
   when the user intention is identified, providing the additional user input to the application.

8. The method of claim 7, wherein identifying the user intention comprises identifying the user intention based on the user input and the additional user input, and wherein the method further comprises providing, responsive to identifying the user intention and after the first user interface is displayed with the effect, the user input to the application.

9. The method of claim 1, wherein the definition of the effect includes identification of:
   one or more remote states of the effect, including an idle state; and
   a set of one or more properties and corresponding values for each of the one or more remote states.

10. The method of claim 9, wherein the definition of the effect further includes identification of:
an animation of the first UI element associated with a transition between two or more different states of the one or more remote states of the effect.

11. The method of claim 1, wherein the definition of the effect further includes an identification of a shape for the effect.

12. The method of claim 11, wherein the shape comprises a dynamic shape.

13. The method of claim 11, wherein the identification of the shape comprises a selection of the shape from a plurality of predefined shapes.

14. The method of claim 11, wherein the shape is inset to the first UI element.

15. The method of claim 11, wherein the identification of the shape comprises instructions for rendering a custom shape for the application.

16. The method of claim 11, wherein the shape is outset to the first UI element.

17. The method of claim 1, wherein the definition of the effect comprises a definition of a single effect to be applied to multiple sub-elements of the first UI element.

18. The method of claim 1, wherein the definition of the effect comprises a definition of multiple effects to be applied to multiple respective sub-elements of the first UI element.

19. The method of claim 1, wherein the user input comprises a pointer-style user input.

20. The method of claim 1, where rendering the effect on the first UI element according to the definition comprises rendering the effect according to the definition and based on background content at a location corresponding to the first UI element.

21. The method of claim 1, wherein the definition of the effect comprises a cross-platform compatible definition that is applicable at the electronic device and at least one other electronic device having a different hardware configuration than the electronic device.

22. The method of claim 1, wherein:
the first UI element is a first entry in a list having a current selection of a second entry in the list; and
in response to the determination that the user input corresponds to the first entry in the list, rendering, by the system process and without providing the user input to the application, the effect on the first entry in the list and an alternate effect on the second entry in the list.

23. The method of claim 1, wherein the effect includes an audio effect.

24. The method of claim 1, wherein the effect is included in a group of effects, and when the effect is rendered, all effects in the group are rendered.

25. The method of claim 1, wherein the rendering, by the system process and without providing the user input to the application, the effect on the first UI element according to the definition comprises:
receiving, by the system process, a description of a user interface of the application, the description including a description of the first UI element; and
rendering, by the system process, the user interface according to the description of the user interface; and
rendering, by the system process, the first UI element within the user interface according to the description of the first UI element and the definition.

26. The method of claim 1, wherein the definition of the effect is a declarative definition and the definition of the effect includes an identification of the first UI element, an identification of a triggering user input, and an identification of the effect to be rendered when the triggering user input corresponds to the first UI element.

27. The method of claim 1, further comprising:
receiving, at the system process from the application, a request for a lighting effect for virtual content managed by the application;
identifying, by the system process while the virtual content is displayed by the electronic device, a lighting condition of a physical environment of the electronic device; and
rendering, by the system process based on the identified lighting condition and without providing the lighting condition to the application, the lighting effect on the virtual content.

28. The method of claim 1, further comprising:
receiving, at the system process from the application, a request for a mirroring effect for virtual content managed by the application;
identifying, by the system process while the virtual content is displayed by the electronic device, one or more features of a physical environment of the electronic device; and
rendering, by the system process based on the identified one or more features and without providing the one or more features of the physical environment to the application, a reflection of the one or more features of the physical environment on the virtual content.

29. The method of claim 1, further comprising:
receiving, at the system process from the application, a request to anchor virtual content to a physical object in a physical environment of the electronic device; and
anchoring, by the system process responsive to the request and without providing information associated with the physical object or the physical environment to the application, the virtual content to the physical object.

30. The method of claim 29, further comprising providing, by the system process to the application, a confirmation that the virtual content has been anchored to the physical object, without providing the information associated with the physical object or the physical environment to the application.

31. The method of claim 29, wherein the virtual content is non-interactive virtual content that includes contextual information about the physical object.

32. The method of claim 29, wherein anchoring the virtual content to the physical object comprises:
identifying, by the system process, the physical object in the physical environment;
receiving, from the application at the system process, rendering information for the virtual content; and
rendering, by the system process, the virtual content at a location on a display of the electronic device that corresponds to a location of the physical object in the physical environment.

33. The method of claim 32, further comprising:
detecting, by the system process, motion of the physical object relative to the electronic device; and
modifying, by the system process and without providing information about the motion of the physical object to the application, the rendering of the virtual content to track the motion of the physical object relative to the electronic device.

34. The method of claim 29, wherein the physical object comprises an image in the physical environment.

35. The method of claim 34, wherein the image comprises a logo, and wherein the virtual content comprises contextual information for the logo.

36. The method of claim 34, wherein the request to anchor the virtual content to the physical object in the physical environment of the electronic device comprises an electronic version of the image.

37. The method of claim 36, further comprising, by the system process and responsive to the request including the electronic version of the image:
monitoring, using the electronic version of the image, the physical environment for the image during operation of the electronic device during a period of time prior to displaying virtual content; and
displaying the virtual content responsive to detecting the image in the physical environment during the monitoring.

38. The method of claim 29, wherein the virtual content comprises the first UI element.

39. A non-transitory computer readable medium storing instructions that, when executed by a processor, cause:
receiving, at a system process of an electronic device from an application running on the electronic device, a definition of an effect for a first user interface (UI) element managed by the application;
receiving, by the system process while the first user interface element is displayed by the electronic device without the effect applied to the first user interface element, a user input; and
in response to a determination that the user input corresponds to the first user interface element displayed without the effect, rendering, by the system process and without providing the user input to the application, the effect on the first UI element according to the definition.

40. The non-transitory computer readable medium of claim 39, wherein the instructions further cause:
identifying, by the system process based on additional user input, a user intention to interact with the application; and
when the user intention is identified, providing the additional user input to the application.

41. The non-transitory computer readable medium of claim 39, wherein the definition of the effect is a declarative definition, and the definition of the effect includes an identification of the first UI element, an identification of a triggering user input, and an identification of the effect to be rendered when the triggering user input corresponds to the first UI element.

42. A system, comprising:
a processor, and
a storage device storing instructions, that, when executed by the processor, cause the system to:
receive, at a system process of an electronic device from an application running on the electronic device, a definition of an effect for a first user interface (UI) element managed by the application;
receive by the system process while the first user interface element is displayed by the electronic device without the effect applied to the first user interface element, a user input; and
in response to a determination that the user input corresponds to the first user interface element displayed without the effect, render, by the system process and without providing the user input to the application, the effect on the first UI element according to the definition.

43. The system of claim 42, wherein the instructions further cause the system to:
identify, by the system process based on additional user input, a user intention to interact with the application; and
when the user intention is identified, provide the additional user input to the application.

44. The system of claim 42, wherein the definition of the effect is a declarative definition, and the definition of the effect includes an identification of the first UI element, an identification of a triggering user input, and an identification of the effect to be rendered when the triggering user input corresponds to the first UI element.

45. A method, comprising:
identifying, at an application process, an application-managed user interface (UI) effect and a remote-UI effect for a first UI element;
providing, by the application process to a system process, a definition of the remote-UI effect and an identification of the first UI element;
receiving, by the application process, a user input corresponding to the first UI element; and
rendering, by the application process, the application-managed UI effect on the first UI element.

46. The method of claim 45, wherein the user input comprises a confirmed user input that has been confirmed by the system process following a preliminary user input corresponding to the first UI element and for which the remote-UI effect was rendered by the system process.

47. The method of claim 46, wherein the first UI element represents an option in a list-selection UI, wherein the remote-UI effect corresponds to a preliminary selection of the option in the list-selection UI, and the application-managed UI effect corresponds to a completed selection of the option in the list-selection UI.

48. The method of claim 46, wherein the confirmed user input comprises a confirmed user input to a second UI element generated by the system process responsive to the preliminary user input to the first UI element.

49. The method of claim 47, wherein the first UI element comprises a list-selection UI that is expanded, responsive to the preliminary user input, to include selectable options, wherein at least one of the selectable options comprises the second UI element.

* * * * *